United States Patent [19]

Van Geel

[11] Patent Number: 5,587,574
[45] Date of Patent: Dec. 24, 1996

[54] NON-CONTACT READER

[76] Inventor: Edward Van Geel, G. Hubertistraat 22, 1030 Schaarbeek, Belgium

[21] Appl. No.: 648,292

[22] Filed: May 15, 1996

Related U.S. Application Data

[63] Continuation of Ser. No. 269,529, Jul. 1, 1994, abandoned.

[30] Foreign Application Priority Data

Jul. 1, 1993 [BE] Belgium .................. 09300679

[51] Int. Cl.$^6$ .................................................. G06K 5/00
[52] U.S. Cl. .................... 235/380; 235/462; 235/492
[58] Field of Search .................... 235/380, 462, 235/492

[56] References Cited

U.S. PATENT DOCUMENTS 4,868,375  9/1989  Blanford .................. 235/462
5,095,197  3/1992  Chadimar .................. 235/462
5,362,954  11/1994  Komatsu .................. 235/380

FOREIGN PATENT DOCUMENTS 4132973  4/1993  Germany .
1594231  7/1981  United Kingdom .

*Primary Examiner*—Harold Pitts
*Attorney, Agent, or Firm*—Bacon & Thomas

[57] ABSTRACT

A non-contact reader includes a reading device which reads information from an information medium without mechanical or galvanic contact when the medium is brought into proximity with the reading device. A test device for testing correct operation of the reading device includes a test information medium which is permanently mounted within range of the reading device and which can be read in the same way as the normal information medium readable by the reader.

12 Claims, 2 Drawing Sheets

NON-CONTACT READER

This application is a continuation of application Ser. No. 08/269,529, filed Jul. 1, 1994, now abandoned.

BACKGROUND OF THE INVENTION

1. Field of the Invention

This invention concerns a non-contact reader which includes a reading device arranged to read information from an information medium without mechanical or galvanic contact, and generate a meaningful signal at the output of the reading device when the information medium is brought into proximity with the reading device, and a test device to test the correct operation of the reading device.

2. Description of Related Art

Non-contact readers with corresponding identification means are known and are marketed in various embodiments.

Such known readers comprise test devices which test the electronic circuit of the reader for correct operation by measuring and evaluating electrical parameters obtained by electrical contact with parts of the circuit.

However, in this way it is never possible to demonstrate the correct operation of the wireless part of the reader with certainty. This is nevertheless essential for judging whether the reader works correctly or not, since the absence of the meaningful signal at the output of the reader is interpreted as the absence of an identification means within range of the reader. DE-A-R.132.973 describes a barcode reader in which the test device includes means to vary the illumination strength of the sensor, for example by altering the light output of the light source, and to evaluate the output signals generated as a result. These means are operated manually by pressing a test button. The testing is carried out while reading a normal identification means introduced into the reader. With this known reader, testing is fairly complicated, while the test device is not simple in construction and demands special modification of the reader, making it expensive.

U.S. Pat. No. 4,868,375 describes a barcode reader whose function can be modified by inserting an identification means with a special barcode. The modified function, for example a diagnosis function, is only started after such a special barcode has been read in. With this reader, testing is fairly complicated and laborious since a medium with a special barcode has to be made and inserted into the reader each time testing is carried out.

SUMMARY OF THE INVENTION

The present invention has as its aim to avoid these disadvantages and to provide a non-contact reader in which testing is very simple and can be carried out quickly without requiring any complex modification of the reader.

According to the invention, this aim is achieved by the reader having a test information medium means, which is permanently set up within range of the reading device and which can be read in the same way as a normal information medium read by the reading device.

Since the test information medium is constantly within range of the reading device, the reading device can be tested at any moment, or even tested continually. When the reading device is working correctly, the reading device will on testing recognize the test information medium as such and will emit a meaningful signal specific to the test information medium.

The test device can comprise a switching system with two states, namely a first state permitting the test information medium to be read by the reading device, and a second state in which this reading is prevented or made impossible.

This embodiment can be useful for readers which can only read one information medium at the same time, and which therefore have to stop reading the test information medium in order to read a normal information medium.

The switching system can be controlled by the reading device.

In other cases, the test information medium can be constructed and positioned with respect to the reading device such that the presence of a normal information medium in proximity with the reading device itself is sufficient to make it impossible for the test information medium to be read by the reading device.

In an advantageous embodiment of the invention, the test information medium comprises readable information about the corresponding reader, so that the meaningful signal at the output of the reading device enables the reader to be identified in an unambiguous manner.

This embodiment is particularly important in the case where several such readers are present and the output signals from the reading devices are sent to the same control unit. This control unit can then determine from which reader a particular test signal comes.

BRIEF DESCRIPTION OF THE DRAWINGS

The invention is explained below on the basis of the following description of a few examples, each representing a possible solution, without limiting the general scope of the invention. This description refers to the accompanying drawings, where.

DETAILED DESCRIPTION OF THE PREFERRED EMBODIMENTS

Figure 1:
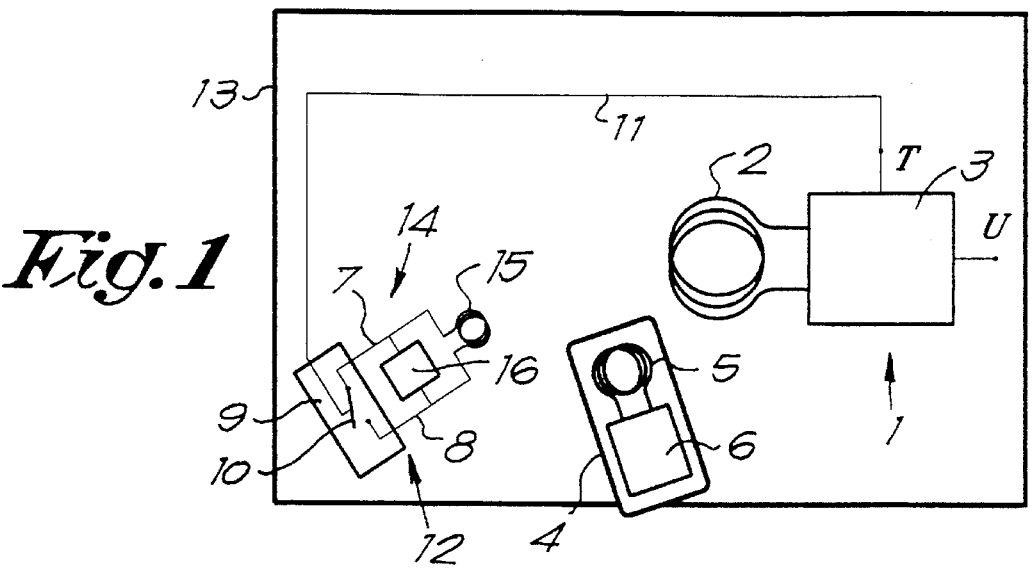
FIG. 1 is a block diagram of a first embodiment of a reader according to the invention.

In a first embodiment, shown in FIG. 1, the reader is used as an access control system and comprises a reading device 1 with as essential parts a coil 2 and an electronic circuit 3 connected to it. At its output U this reading device 1 supplies a meaningful signal.

The electronic circuit 3 is constructed such that it can excite the coil 2 with a given frequency, for example several times per second, so that coil 2 emits a signal.

The reader serves to read corresponding information media, more particularly the identification means 4, one of which is shown in FIG. 1. Each of said information means 4 normally takes the form of a card, for example forming part of a key ring. Said card contains as its essential components a coil 5 and an electronic circuit 6.

The reader works as follows:

When its coil 2 is excited, the latter emits signals at regular intervals, either continually or only when reading is required. When an identification means 4 is brought sufficiently close to the reading device 1, the signal is received by the coil 5 in said identification medium 4, and, if said information medium belongs to the reader, the signal is recognised by the electronic circuit 6. Said electronic circuit 6 varies the damping of coil 5 at a preset rhythm. The coil 2 of the reading device 1 senses this variation and sends a signal to the electronic circuit 3 which detects the rhythm of the identification medium 4 from this signal. The information conveyed in this way from the identification means 4 to the reading device 1 is used by the electronic circuit 3 of the reading device 1 to determine the meaningful signal at its output U.

The reading device 1 described thus far is generally known and available on the market in various embodiments.

According to the invention, to this reading device 1 is added a test device 12 comprising a test identification means 14 permanently mounted within range of the reading device 1, more particularly within range of the field of the coil 2. Said test identification means 14 comprises the same essential components as an ordinary identification means 4, namely a coil 15 with an electronic circuit 16 connected to it. Only the housing, for example formed by a card, is superfluous. The above-mentioned parts are mounted in the same housing 13 in which the reading device 1 itself is mounted.

Whenever the reading device 1 emits a signal via its coil 2, this signal is received by the coil 15 of the test identification means 14 and recognised by the electronic switch 16 which varies the damping of the coil according to a predetermined rhythm. The reading device 1 also recognises this test identification means 14 in an analogous manner to the identification of a normal identification means 4, and presents a corresponding meaningful signal at the output U.

In the embodiment as shown in FIG. 1, the test device 12 comprises a switching element 10 connected to the coil 15 by means of connections 7 and 8, forming a switching system 9 which can prevent the interaction between the test identification means 14 and the reading device 1.

When the switching element 10 is open, the operation of the coil 15 and of the electronic circuit 16 is not prevented, and the test device 12 functions. When on the other hand the switching element 10 is closed, the coil 15 is short-circuited through the connections 7 and 8, so that the electronic circuit 16 is prevented from working, in which case the test device 12 is inactive.

In this embodiment, in this way it is possible to avoid that the test device 12 operates continuously and thus to prevent the reading device 1 from recognising other, normal identification means 4.

In this embodiment, the switching system 9 is controlled by the reading device 1. For this purpose, an extra output T is incorporated in the reading device 1, connected to the test device 12 by a connection T. The reading device 1 supplies a signal at the moment that the electronic circuit 3 commands the operation of the test device 12. This signal is chosen such that the switching element 10 can open or close, according to whether the test device 12 is supposed to work or not.

The electronic circuit 6 is in particular set such that the meaningful signal arising at the output U of the reading device 1 as a consequence of the interaction between said reading device 1 and the test device 12 also enables the reading device 1 to be identified unambiguously.

If several of the readers described above, with a reading device 1 and a test device 12, have their outputs U of their reading devices 1 connected to a common control unit, said control unit can therefore determine from which particular reader the meaningful signal is emitted as a result of reading a normal identification means 4 or as a result of reading the test identification means 14.

Figure 2:
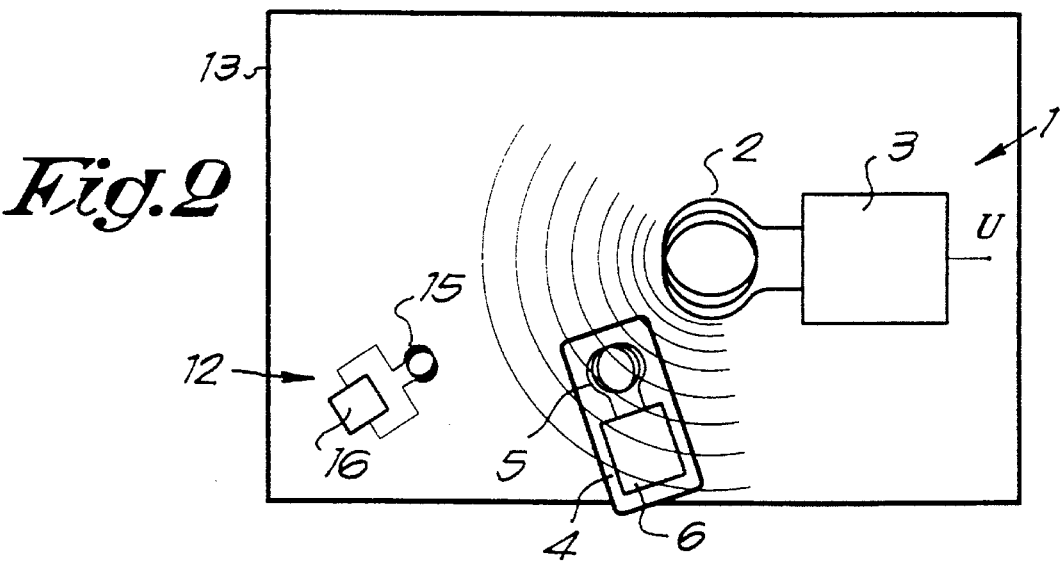
FIG. 2 is block diagram analogous to that in FIG. 1, but for a second embodiment of the reader according to the invention.

The embodiment shown in FIG. 2 differs from the embodiment described above only in that the test identification means 14 is constructed and mounted with respect to the reading device 1 such that bringing a normal identification means 4 into proximity with the coil 2 automatically suppresses the influence of the test identification means 14, so that the switching system is unnecessary. The test device 12 accordingly does not have a switching system 9.

This can be achieved by placing the test identification means 14 such that a normal identification means 4 can be brought nearer the coil 2 than a test identification means 14 and/or by making the coil 15 of the test identification means 14 smaller than the coil 5.

When a normal identification means 4 is brought into proximity with the coil 2, it absorbs practically the entire signal of the excited coil 2, so that only a weak signal can reach the coil 15 of the test identification means 14. This signal is so weak that the test identification means 14 does not react any more and can no longer influence the coil 2.

In this embodiment, the test device 12 can be continually available for testing. It operates continually, except when a normal identification means 4 is brought into proximity with the reading device 1.

Figure 3:
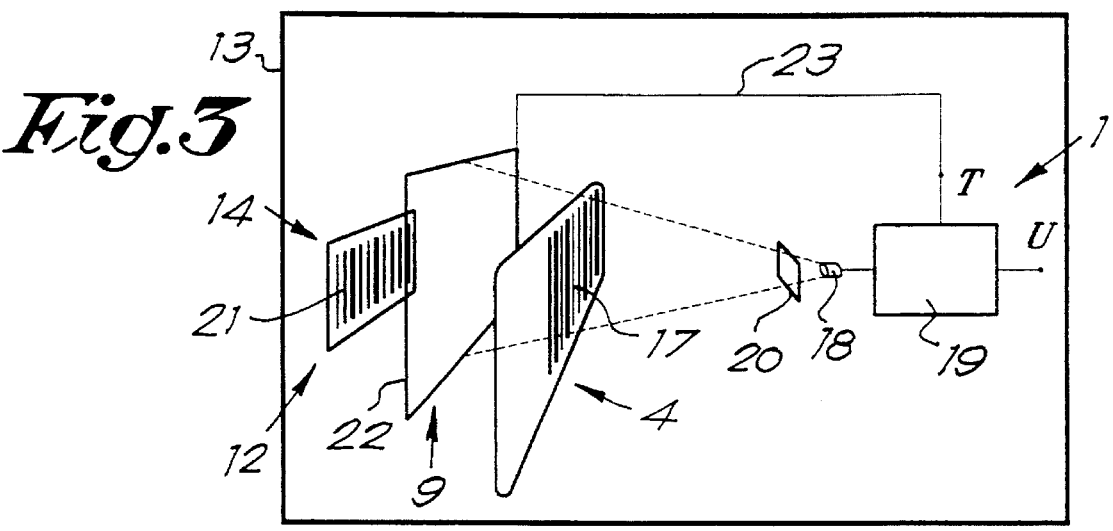
FIG. 3 is a block diagram analogous to that in the previous figures, but for a third embodiment of the reader according to the invention.

In the embodiment shown in FIG. 3, the reader is an optical reader, namely a barcode reader used for identifying products or other media presented to it by means of an optically readable pattern, more particularly a barcode 17 which is applied to the product or medium and which forms the normal identification means 4.

This reader also comprises a reading device 1 and a test device 12, but both the reading and the testing are done optically.

The reading device 1 in this case comprises an optical instrument 18, namely a barcode reader with a laser source and a sensor, of known construction, to which is connected an electronic circuit 19. The optical instrument 18 is placed behind a window 20 which determines the spatial limitation of the scope of the reading device 1.

The reading device 1 can identify a product or other medium when this is presented with its barcode 17 visible through the window 20. It then generates the meaningful signal at the output U of the electronic circuit 19.

Such reading devices are generally known and available on the market in various embodiments.

The test device 12 which according to the invention is added to said reading device 1 consists of a test identification means 14 formed by a valid test barcode 21 applied to a medium and mounted in a fixed place within range of the reading device 1, preferably within the same housing 13.

The test barcode 21 can accordingly be perceived by the optical instrument 18, in which case a corresponding signal is supplied by the electronic circuit 19 at the output U.

When a normal identification means 4, namely a barcode 17 applied to for example a card, is presented in front of the window 20, the test barcode 21 which forms the test identification means 14 is generally shielded automatically from the optical instrument 18.

Where this does not happen, or if necessary to prevent the test barcode 21 being perceived continuously, a switching system 9 can prevent the interaction between the test identification means 4 and the reading device 1, in an analogous way to the previous embodiments. In this case, said switching system is formed by a screen 22 which is placed between the test barcode 21 and the window 20 and which is normally opaque, but which can be made transparent by applying a voltage. The screen 22 is accordingly connected by means of a connection 23 to an extra output T of the electronic circuit 19 of the test device 1. Whenever a test has to be carried out, the switch 3 can cause the screen 22 to become opaque; alternatively, the screen can be continually transparent but whenever a normal identification means 4 is presented to the reading device 1, the electronic circuit 3 can cause the screen 22 to become opaque.

In this embodiment also, it is particularly advantageous for the test device 12 to make a unique identification of the reading device 1 possible. In this case, the test barcode 21 is chosen so as to make such identification possible.

Figure 4:
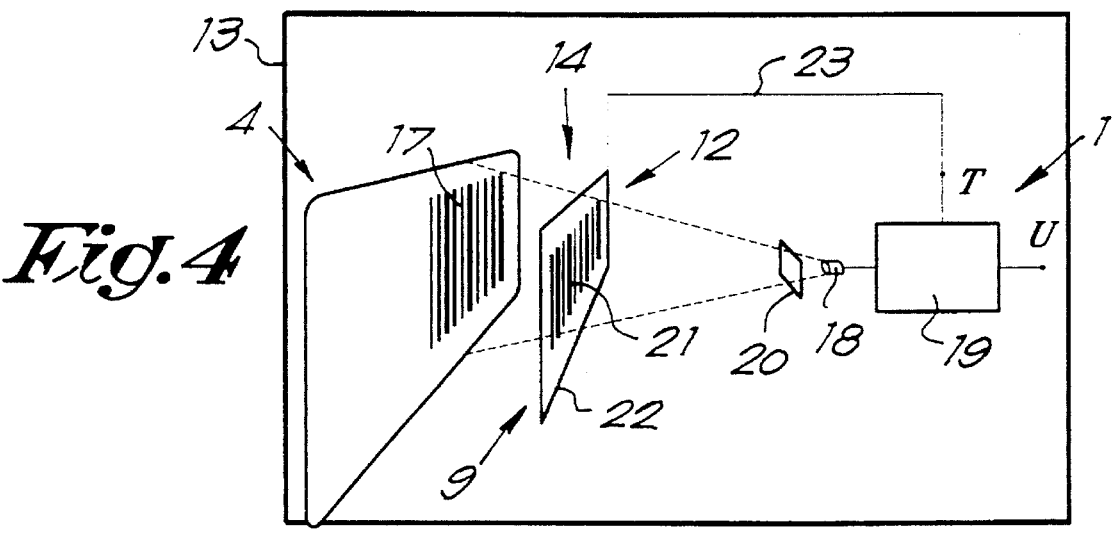
FIG. 4 is a block diagram analogous to that in FIG. 3, but for a fourth embodiment of the reader according to the invention.

In a variant of the previous embodiment, the test barcode 21, as shown in FIG. 4, is applied directly to the screen 22. Said screen 22 is an LCD (liquid crystal display) screen which when a voltage is applied is opaque and presents the test barcode 21 to the optical instrument 18, but which when no voltage is applied is transparent so that a barcode 17 presented behind said screen 22 can be read by the optical instrument 18. The electronic circuit 19 determines whether the screen 22 has a voltage applied to it or not, and thus whether the test barcode 21 or a normal barcode 17 is read.

In the last two embodiments, the optical instrument 18 does not necessarily have to be a barcode reader with a laser beam source and a sensor. This instrument can comprise only a sensor, being for example a CCD camera, with the identification means 4 or 14 being illuminated by a separate light source or even by the ambient light.

The transition from reading a normal identification means 4 to reading the test identification means 14 can also be achieved mechanically, for example by a rotation or displacement of the optical instrument 18, or by deflecting the light beam.

The information medium or the test identification medium 14 in the embodiment with an optical reader does not necessarily have to be a barcode. Instead of this, other patterns are possible, such as for example letters and numbers, provided these can be read by the reading device.

The test information medium does not necessarily have to be mounted in the same housing as the reading device. All that is important is for it to be constantly available for testing at any given moment.

I claim:

1. A non-contact reader, comprising:
   a reading device arranged to read information from a normal information medium without mechanical or galvanic contact and, in response, generate a meaningful signal, when the information medium is brought into proximity with the reading device;
   a test device arranged to test correct operation of the reader, said test device including a test information medium which is a medium of the same type as the normal information medium; and
   means for permanently mounting the test information medium within range of the reading device so that the test information medium can be read by the reading device in the same way as said normal information medium is read by the reading device to enable the reading device to be tested at any moment or even continually.

2. A reader as claimed in claim 1, wherein the reading device comprises a coil and an electronic circuit, and the test information medium also comprises a coil and electronic circuit.

3. A reader as claimed in claim 2, wherein the switching element is shunted across the coil of the test information medium and short-circuits the coil when closed.

4. A non-contact reader as claimed in claim 1, wherein the reading device comprises an optical instrument and an electronic circuit connected to the optical instrument, and wherein the test information medium includes an optically readable pattern.

5. A non-contact reader as claimed in claim 1, wherein the test device includes a switching system having two states, the first state permitting reading of the test information medium by the reading device and the second state preventing such reading.

6. A reader as claimed in claim 1, wherein when the test information medium is read, interaction occurs between the test information medium and the reading device, and further including means for preventing the interaction between the reading device and the test information medium.

7. A reader as claimed in claim 6, wherein the interaction preventing means is a switching system controlled by the reading device.

8. A reader as claimed in claim 6, wherein the reading device comprises an optical instrument and the test information medium includes a test bar code, and wherein the means for preventing interaction between the test identification means and the reading device comprises a screen and means for controlling the screen to be transparent in one state and to have at least partially areas opaque in another state to selectively present said test bar code to the reading drive.

9. A reader as claimed in claim 8, wherein the screen is mounted between the test information medium and the reading device.

10. A reader as claimed in claim 8, wherein the bar code is formed on the screen by said partially opaque areas.

11. A reader as claimed in claim 1, wherein the test information medium is constructed and mounted relative to the reading device such that the presence of a normal information medium in proximity with the reading device makes reading of the test information medium by the reading device impossible.

12. A reader as claimed in claim 1, wherein the test information medium carries readable information about the reading device which is read by the reading device, said meaningful signal further including said readable information read by the reading device to enable the reading device to be identified unambiguously.

\* \* \* \* \*